US009592178B1

(12) United States Patent
Cargill

(10) Patent No.: US 9,592,178 B1
(45) Date of Patent: Mar. 14, 2017

(54) SYSTEM FOR REPELLING MOSQUITOES NEAR A SPA

(71) Applicant: Boyd Billy Cargill, Temecula, CA (US)

(72) Inventor: Boyd Billy Cargill, Temecula, CA (US)

( * ) Notice: Subject to any disclaimer, the term of this patent is extended or adjusted under 35 U.S.C. 154(b) by 0 days.

(21) Appl. No.: 15/263,424

(22) Filed: Sep. 13, 2016

(51) Int. Cl.
*A47K 3/00* (2006.01)
*A61H 33/00* (2006.01)
*A01M 7/00* (2006.01)
*B05B 9/04* (2006.01)
*B05B 13/02* (2006.01)
*B05B 15/06* (2006.01)

(52) U.S. Cl.
CPC ....... *A61H 33/6005* (2013.01); *A01M 7/0003* (2013.01); *B05B 9/0423* (2013.01); *B05B 13/0278* (2013.01); *B05B 15/065* (2013.01); *A61H 2033/0037* (2013.01)

(58) Field of Classification Search
CPC ....... A47K 3/001
USPC ....... 4/538–595
See application file for complete search history.

(56) References Cited

U.S. PATENT DOCUMENTS 4,846,525 A * 7/1989 Manning ................ A47C 1/143 222/175
5,339,854 A * 8/1994 Leith ........................ G05D 9/12 137/101.25
6,554,208 B1 * 4/2003 Venuto, Sr. ............ A45D 44/00 239/207
2003/0094509 A1 * 5/2003 Venuto, Sr. ............ A45D 44/00 239/200
2006/0083763 A1 * 4/2006 Neale ..................... A01N 25/06 424/405
2008/0004677 A1 * 1/2008 Gay ....................... A61H 23/04 607/85
2008/0187607 A1 * 8/2008 Bessette ................. A01N 25/00 424/739
2014/0130413 A1 * 5/2014 Storey .................... A01G 31/06 47/62 A
2016/0039623 A1 * 2/2016 Pellizzari ............. B65G 67/606 239/200
2016/0166969 A1 * 6/2016 Pellizzari ............... B01D 47/06 261/23.1

* cited by examiner

*Primary Examiner* — Lori Baker
(74) *Attorney, Agent, or Firm* — Loyal McKinley Hanson

(57) ABSTRACT

A system for repelling mosquitoes near a spa (referred to herein as a “Zika Mist System” or “ZMS”) includes a string of misting devices interconnected in fluid communications for mounting on a spa tub structure in order to produce an insect-repelling, spa-water mist over the spa from chemically treated spa water taken from the spa. The ZMS includes a misting pump for delivering pressurized spa water from an outlet on the misting pump to the string of misting devices via an outlet line component of the ZMS; it also includes an input line for coupling an inlet of the misting pump in fluid communications with a water-holding portion of the spa (e.g., preferably doing so via a drain assembly on the spa). A mosquito-repelling spa includes a spa tub structure on which is mounted such a ZMS.

8 Claims, 6 Drawing Sheets

SYSTEM FOR REPELLING MOSQUITOES NEAR A SPA

BACKGROUND OF THE INVENTION

1. Technical Field

This invention relates generally to the field of spas, hot tubs, swim spas, spa pools, and the like, and more particularly to a system for repelling mosquitoes and other such flying insects near a spa.

2. Description of Related Art

The term "spa" herein includes a large tub structure or small pool (i.e., a water-holding vessel), that a user can fill with water (e.g., heated water) for hydrotherapy, relaxation, or pleasure. Such spas include hot tubs, swim spas, spa pools, and the like. They are usually designed to be used by more than one person at a time, with many models accommodating four or more people. The water in the spa (i.e., "spa water") is usually not changed with each use; it is kept sanitary in the tub structure without changing by using methods similar to the methods used for swimming pool sanitation; the spa water is chemically treated for sanitation purposes. Chlorine and bromine are, for example, two commonly used spa-water sanitizers for chemically treating spa water in order to eliminate microbial contaminants.

Spas are often installed and used outdoors. One problem resulting from such use is the annoyance and danger of mosquitoes and other such flying insects that are attracted to the spa. Mosquitoes, in particular, are recognized carriers of various viruses (e.g., the "Zika virus") and avoidance of mosquito bites can be a significant concern to spa users.

SUMMARY OF THE INVENTION

In view of the foregoing, it is the primary objective of the present invention to alleviate the concern outlined above. The present invention achieves this objective predicated on the inventors' recognition of that concern, followed by the inventor's conception of a spa-water misting system for repelling mosquitoes near a spa. The misting system is referred to herein as a "Zika Mist System" or "ZMS." It produces a mist (i.e., fine droplets of water) over the spa using water from the spa (i.e., a "spa-water mist"). Spa water (usually chemically treated) is pumped through multiple misting devices mounted in spaced-apart locations on the tub structure of the spa in order to thereby produce the spa-water mist. The spa-water mist helps repel mosquitoes in the vicinity of the spa, especially when the spa water has been chemically treated, with much of the spa-water mist returning to the spa where it recirculates with other spa water.

To paraphrase some of the more precise language appearing in the claims and further introduce the nomenclature used, a ZMS constructed according to the present invention includes a plurality of misting devices for mounting on a tub structure of the spa as means for producing a mosquito-repelling mist over the tub structure. A plurality of tubing sections interconnect those misting devices in fluid communications with each other to form a string of misting devices. A misting pump is included for delivering pressurized spa water to the string of misting devices. An output line is provided for connecting the outlet of the misting pump in fluid communications with the string of misting devices, while an input line is provided for connecting the inlet of the misting pump in fluid communication with a water-holding portion of the spa.

In line with the foregoing, a mosquito-repelling spa constructed according to another aspect of the present invention includes a spa tub structure on which is mounted such a ZMS. According to yet another aspect, the inlet of the misting pump is coupled in fluid communications with a drain assembly of the spa as a means for gaining access to the spa water; no new spa water port is required on the tub structure for purposes of accessing spa water. Still another aspect concerns misting devices that include through-wall fittings for mounting in through-bores on a peripheral portion of the tub structure.

Thus, with one or more of these inventive aspects, the present invention alleviates the concerns outline above by repelling mosquitoes and other such insects near a spa with a spa-water mist using spa water (i.e., preferably chemically treated spa water) taken from the spa. The following detailed description and accompanying illustrative drawings make the foregoing and other objectives, features, and advantages of the invention more apparent.

DESCRIPTION OF THE PREFERRED EMBODIMENTS

Figure 1:
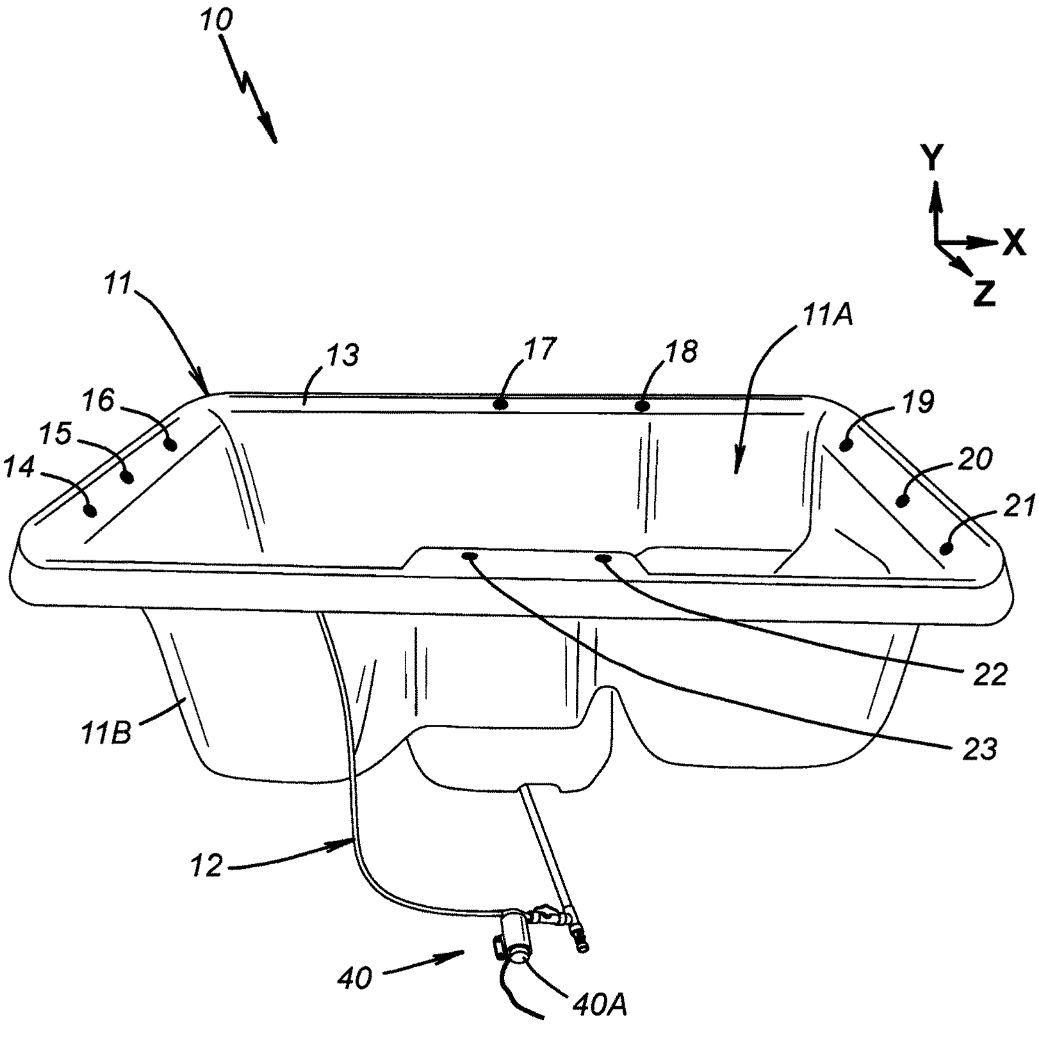
FIG. 1 of the drawings is a perspective view of a mosquito-repelling spa constructed according to the present invention in the form of a spa tub structure on which is mounted a ZMS.
Figure 2:
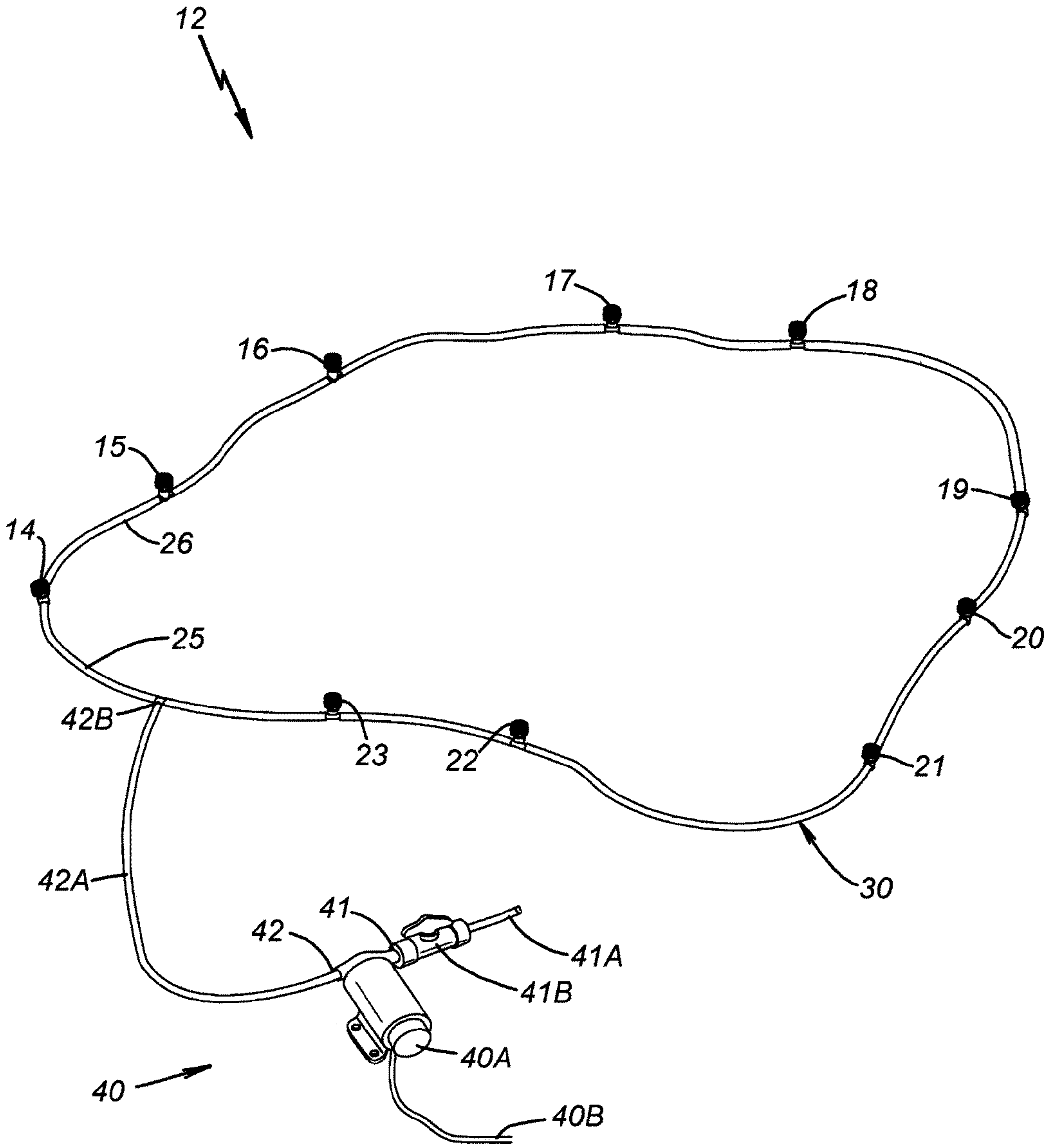
FIG. 2 of the drawings is an enlarged perspective view of the ZMS components, showing the individual misting devices coupled in fluid communication with each other and the misting pump via spa-water-conveying tubing.

FIGS. 1 and 2 of the drawings show some overall structural details of a mosquito-repelling spa (i.e., a spa 10) that is constructed according to the present invention. Generally, the spa 10 includes a tub structure 11 (FIG. 1) on which is mounted a ZMS 12. The ZMS 12 (FIGS. 1 and 2) takes chemically treated spa water from the spa 10 to produce a mosquito-repelling mist over the spa 10 via misting devices provided on the spa 10 for that purpose. The ZMS 12 is identified generally in FIG. 1 and it is illustrated in further detail in FIG. 2.

The spa 10 is illustrated in its usual operative position in FIG. 1, with an upwardly opening interior 11A of the tub structure 11 facing upwardly, away from the horizontally disposed XZ-plane of the XYZ Cartesian coordinate system provided in FIG. 1. The interior 11A of the tub structure 11 is defined by a spa sidewall portion 11B and a bottom portion 11C of the tub structure 11. The spa sidewall structure 11B is identified in FIGS. 1 and 6, while the bottom structure 11C is identified in just FIG. 6. In use, the interior 11A holds the spa water (the spa water is not shown for illustrative purposes).

The illustrated spa 10 represents any of various kinds and types of spas, including those commercially available from Vortex Whirlpool Systems, Inc. of Perris, Calif. The tub structure of a typical hot tub available from that company under the trademark "CATALINA SPAS" has dimensions of up to about inches (i.e., 228.6 cm) wide, measured parallel to the X-axis, and inches (228.6 cm) long, measured parallel to the Z-axis, by about 36 inches (91.44 cm) high, measured parallel to the Y-axis. Such a tub structure may hold up to about 200 gallons (757.08 liters) to about 500 gallons (1892.71 liters) of spa water for use by two to six people. Similarly, the tub structure of a typical swim spa available from the same company under the trademark "CATALINA SWIM SPAS" is about 90 inches (228.6 cm) wide, with various models having lengths of about 12 feet (3.66 meters), 14 feet (4.572 meters), 16 feet (4.8768 meters), 18 feet (5.4864 meters), and 21 feet (6.4008 meters). The tub structure of typical pool spas available from that company under the trademark "CATALINA POOLS" is about inches (228.6 cm) wide and 62 inches (157.48 cm) high, by about feet (6.4008 meters) long. Of course, other spa sizes may be used for a mosquito-repelling spa constructed according to the present invention.

The tub structure 11 (FIG. 1) of the spa 10 represents any of various kinds and types of tub structures that function as water-holding components of a spa, including the tub structures of the spas available from the company mentioned above. The tub structure 11 functions as a rigid vessel for holding spa water, while supporting users in the spa water. It may be composed of any of various suitable materials (e.g., fiberglass on a molded acrylic shell) and include plumbing parts, water jets, control components, mood lighting, and even a spa stereo system and television unit (not illustrated). The tub structure 11 includes a peripheral portion 13 of the tub structure 11 on which the ZMS 12 is mounted to form a mosquito-repelling spa constructed according to the present invention. The peripheral portion 13 is an outwardly disposed, upper marginal edge portion of the tub structure 11 having a thickness on the order of about 0.50 inches (1.27 cm) to about 0.625 inches (1.5875 cm).

The ZMS 12 includes a plurality of mist-producing misting devices (sometimes called mist emitters) designed for mounting on a spa tub structure in order to produce a mosquito-repelling spa according to the present invention. They may be mounted as either a retrofit installation on an existing spa, or as an original part on a newly manufactured spa. FIGS. 1 and 2 illustrate ten such misting devices 14 through 23. As illustrated in FIG. 1, they are mounted on the peripheral portion 13 of the tub structure 11 in order to form the mosquito-repelling spa 10; they are illustrated in FIG. 2 with the other components of the ZMS 12 (without the tub structure 11). Of course, a different number of misting devices (other than the illustrated ten) may be provided according to the size and shape of the tub structure on which they are or will be mounted.

The ZMS 12 includes pieces of tubing (i.e., spa-water-conveying "tubing pieces") that interconnect the misting devices in fluid communications with each other. Those tubing pieces convey spa water and they may take the form, for example, of multiple pieces of a known and commercially available ⅜-inch (0.9525 cm) inside diameter tubing that includes braided nylon reinforcement; they may have lengths on the order of about 20 inches (50.8 cm) to about 40 inches (101.6 cm), depending on the details of any particular installation. Two such tubing pieces 25 and 26 are shown in FIG. 2, interconnecting the misting device 14 with the misting devices 23 and 15; connection to the misting device 23 may be made with a T-connector described later on. The other tubing pieces are similar to the tubing pieces 25 and 26 and so they are not individually identified with reference numerals. With all the misting devices so interconnected by tubing pieces, they form what is referred to herein as "a string of misting devices" (i.e., a string 30).

For purposes of delivering pressurized spa water to the string 30 of misting devices, the ZMS 12 includes a misting pump assembly 40 having a misting pump 40A and associated parts (FIGS. 1 and 2). Preferably, the misting pump 40A is mounted in an out-of-the-way location on the spa 10. It has a misting pump inlet (i.e., an inlet 41 for receiving a flow of water) and a misting pump outlet (i.e., an outlet 42 for discharging pressurized water). Operation of the misting pump 40A results in water flowing into the inlet 41 and pressurized water flowing out of the outlet 42. The inlet 41 and the outlet 42 are identified in FIG. 2. The misting pump 40A may, for example, be a known type of commercially available misting booster pump that is electrically powered (e.g., 120 volts alternating current) and that produces an output water pressure at the outlet 42 that is sufficient to create a mist via the misting devices 14-23. The output pressure of the misting pump 40A may, for example, be on the order of about 60 psi (413.685 kiloPascals) for that purpose. Other kinds and types of misting pumps may be used instead, depending on the particular requirements of the spa-water misting system with which use of the pump is intended.

The other associated parts of the pump assembly 40 include an input line 41A and a shut-off valve 41B (FIG. 2) that cooperatively couple spa water from the tub structure 11 of the spa 10 to the inlet 41 of the misting pump 40A. In addition, the associated parts of the pump assembly 40 include an output line 42A and a T-connector 42B that cooperatively couple pressurized spa water from the outlet 42 of the misting pump 40A in fluid communications with the string 30 of misting devices 14-23. Electric power is coupled to the misting pump 40A via an electric power cord 40B that is also identified in FIG. 2 (shown foreshortened for illustrative purposes).

Figure 3:
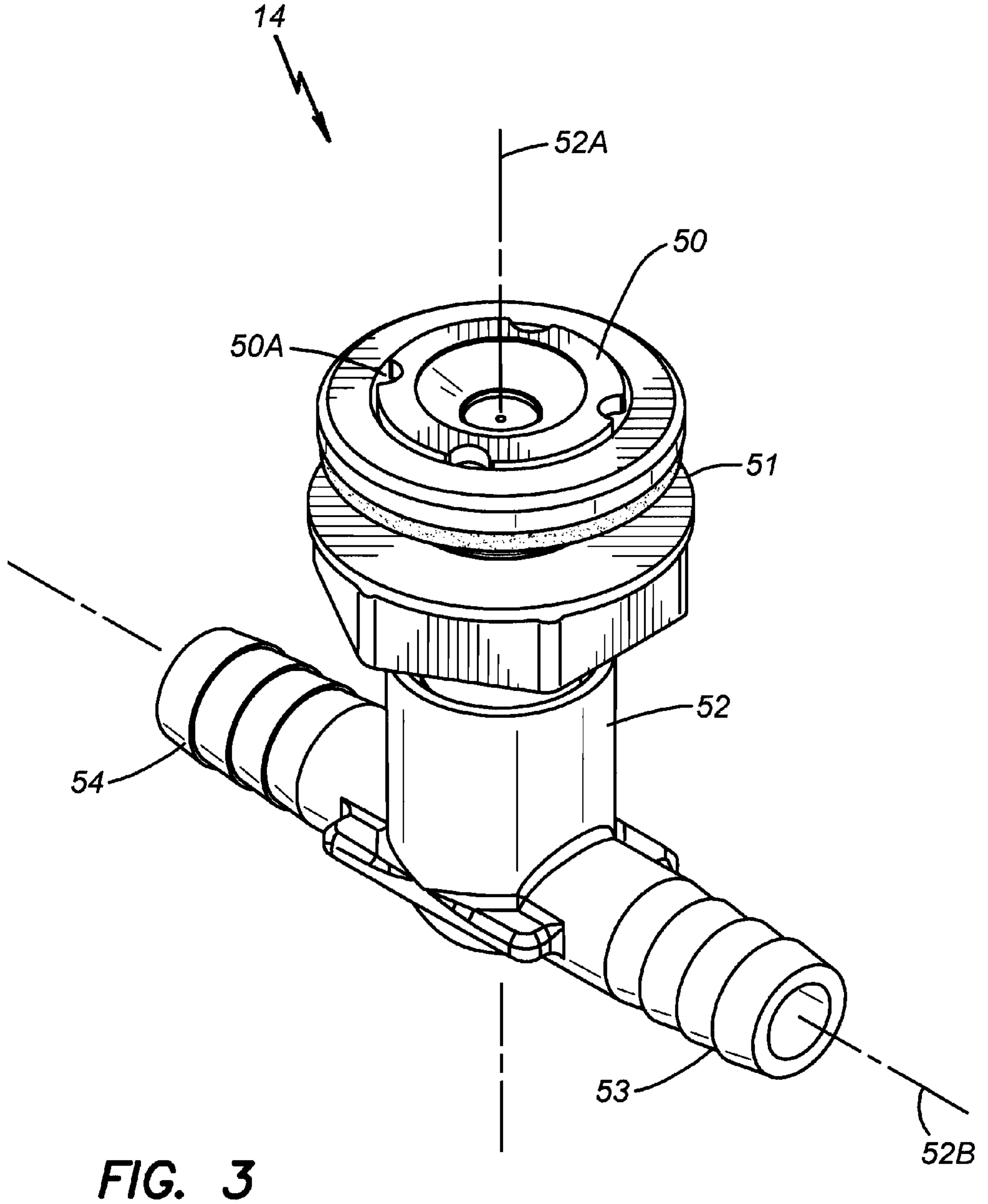
FIG. 3 is a further enlarged perspective view of one misting device.
Figure 4:
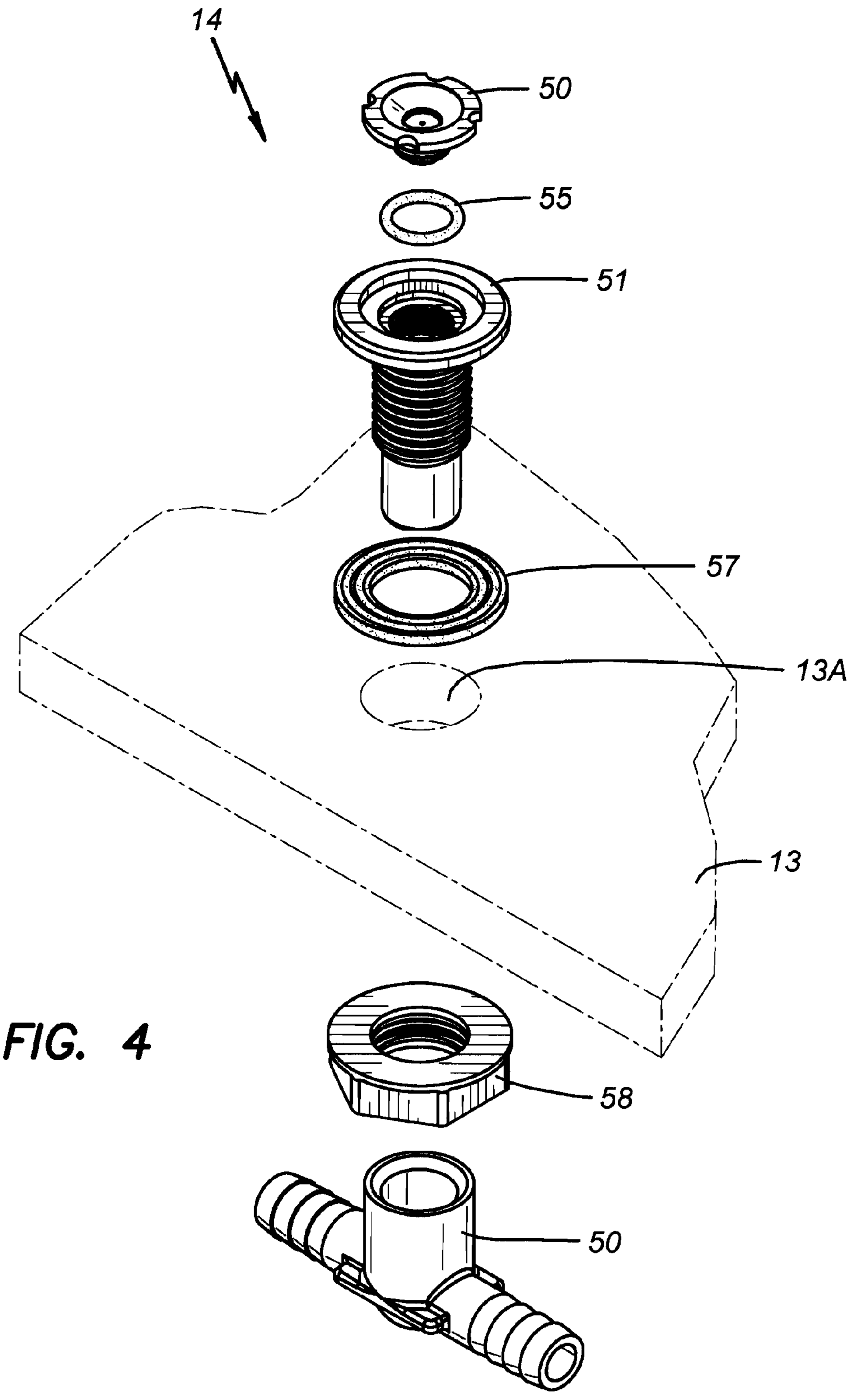
FIG. 4 is an exploded view of the one misting device, showing its component parts and how it is mounted in a through-bore on the tub structure of the spa.
Figure 5:
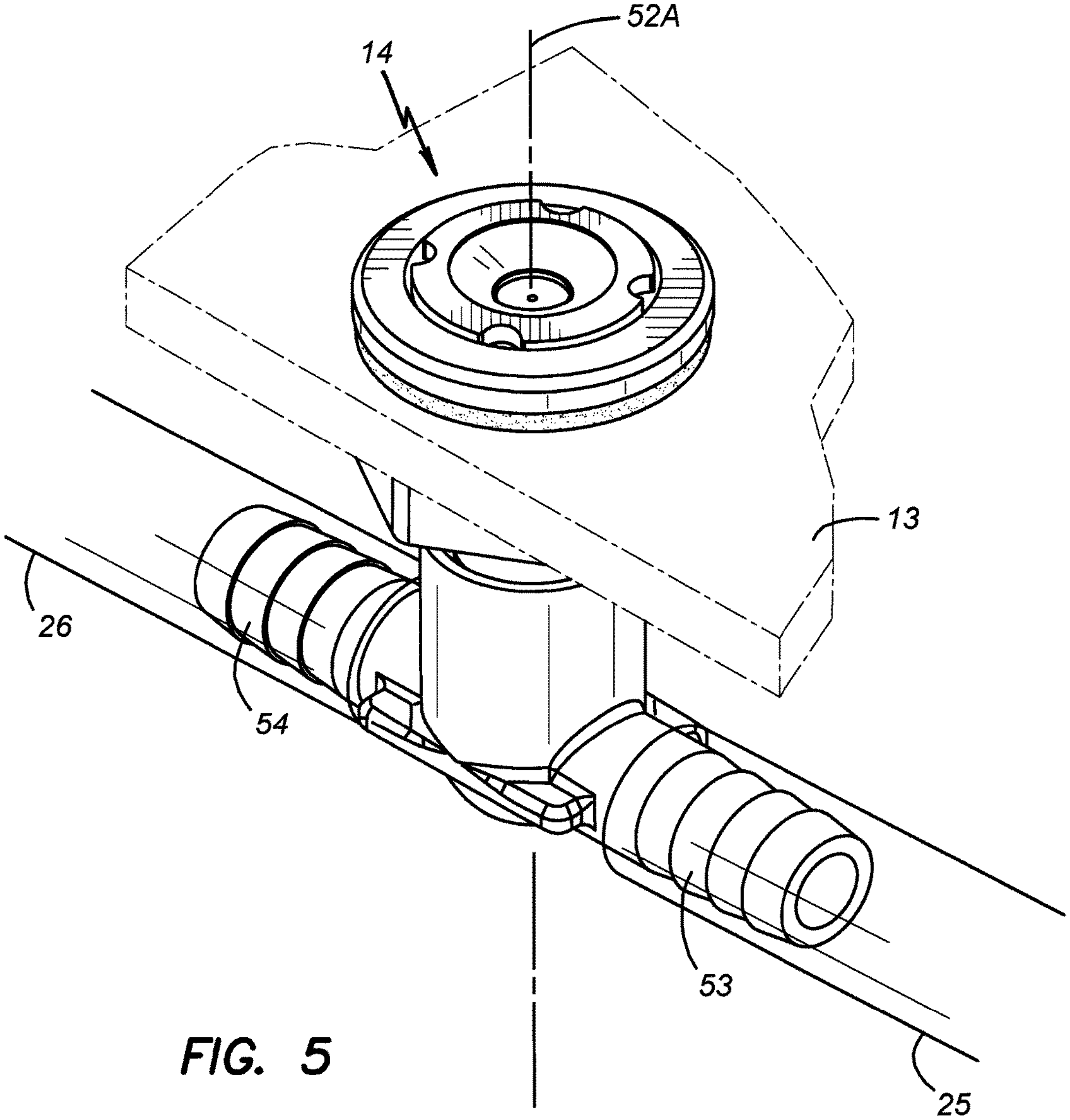
FIG. 5 is a perspective view of the misting device after it has been mounted on the tub structure of the spa and connected to spa-water-conveying tubing.

Turning now to FIGS. 3, 4, and 5, they show various details of the misting device 14. The structure of the other misting devices 15 through 23 are similar to the structure of the misting device 14, and so they are not described here in further detail. First consider FIG. 3; it illustrates the misting device 14 fully assembled apart from the spa 10. The misting device 14 includes an adjustable mist nozzle that is referred to herein as a head 50 of the misting device 14. The head 50 is shown assembled, via a through-wall fitting 51 part of the misting device 14, onto a body 52 part of the device 14. First and second barbed insert connector portions 53 and 54 of the body 52 enable an assembler to connect the tubing pieces 25 and 26 to the misting device 14 in a known way to form the string 30 shown in FIG. 2; the barbed insert connector portions 53 and 54 fit snugly into the ends of the tubing pieces 25 and 26. When the misting device 14 is in use, spa water flows into the barbed insert connector portion 53, with most of the spa water then flowing out of the barbed insert connection portion 54 to other misting devices, but with some of the spa water flowing through the hollow interior of the misting device 14 and out apertures (i.e., openings or mist-discharging ports) in the head 50 as spa-water mist (one such mist-discharging port 50A is identified in FIG. 3).

To further visualize size, first notice that the illustrated misting device 14 includes a first axis of elongation 52A shown in FIG. 3 (i.e., a straight line axis of elongation) that extends centrally through the hollow interiors of the body 52, the through-wall fitting 51, and the head 50. The misting device 14 also includes a second axis of elongation 52B (i.e., also a straight line axis of elongation) that extends centrally through the hollow interiors of the first and second barbed insert connector portions 53 and 54 of the body 52, perpendicular to the first axis 52A as shown. Using those axes as references, the overall height of the body 52 measured along the first axis of elongation 52A is about 1.05 inches (2.667 cm), and the overall length of the body 52 measured along the second axis of elongation 52B (including the barbed insert connectors portions 53 and 54) is about 2.49 inches (6.3246 cm). The other parts illustrated in FIGS. 3 and 5 are drawn with the same drawing scale so that their relative sizes can be ascertained by comparison to the above-stated dimensions of the body 52.

FIG. 4 is an exploded view of the misting device 14, with a portion of the tub structure 11 shown in phantom lines in order to show a through-bore 13A in the peripheral portion 13 of the tub structure 11 through which the through-wall fitting 51 of the misting device 14 is mounted. An O-ring 55 having an outside diameter of about 0.50 inches (1.27 cm) functions as a sealing member between the head 50 and a through-wall fitting 51. The lower portion of the head 50 has an exterior thread that functions as means for engaging an interiorly threaded upper portion of the through-wall fitting 51. The illustrated through-wall fitting 51 has an overall height (measured along the first axis of elongation 52A shown in FIG. 3) of about 1.49 inches (3.7846 cm), a size sufficient to extend fully through a gasket 57 and the through-bore 13A in the peripheral portion 13. The externally threaded portion of the through-wall fitting 51 has a diameter on the order of about 0.50 inches (1.27 cm).

The diameter of the through-bore 13A is sufficiently large so that an assembler can readily insert the externally threaded portion of the through-wall fitting 51 into the through-bore 13A for purposes of mounting of the misting device 14 on the peripheral portion 13. The through-bore 13A may, for example, have a diameter of about 0.625 inches (1.5875 cm) in order to receive an externally threaded portion of the through-wall fitting having a diameter of about 0.50 inches (1.27 cm). A nut 58 functions as means for securing the through-wall fitting 51 in the through-bore 13A with enough force to produce a fluid-tight seal by the gasket 57.

To complete the mounting of the misting device 14 on the peripheral portion 13, after adding the nut 58, the installer secures the body 50 on the lower end portion of the through-wall fitting 51 by suitable means (e.g., bonding with an epoxy adhesive). Doing so results in an installed misting device 14, as it is shown in FIG. 5. When fully installed on the tub structure 11 of the spa 10, the ZMS 12 includes the first and second barbed insert connector portions 53 and 54 of the misting device 14 inserted in respective ones of the tubing pieces 25 and 26, as also shown in FIG. 5.

Figure 6:
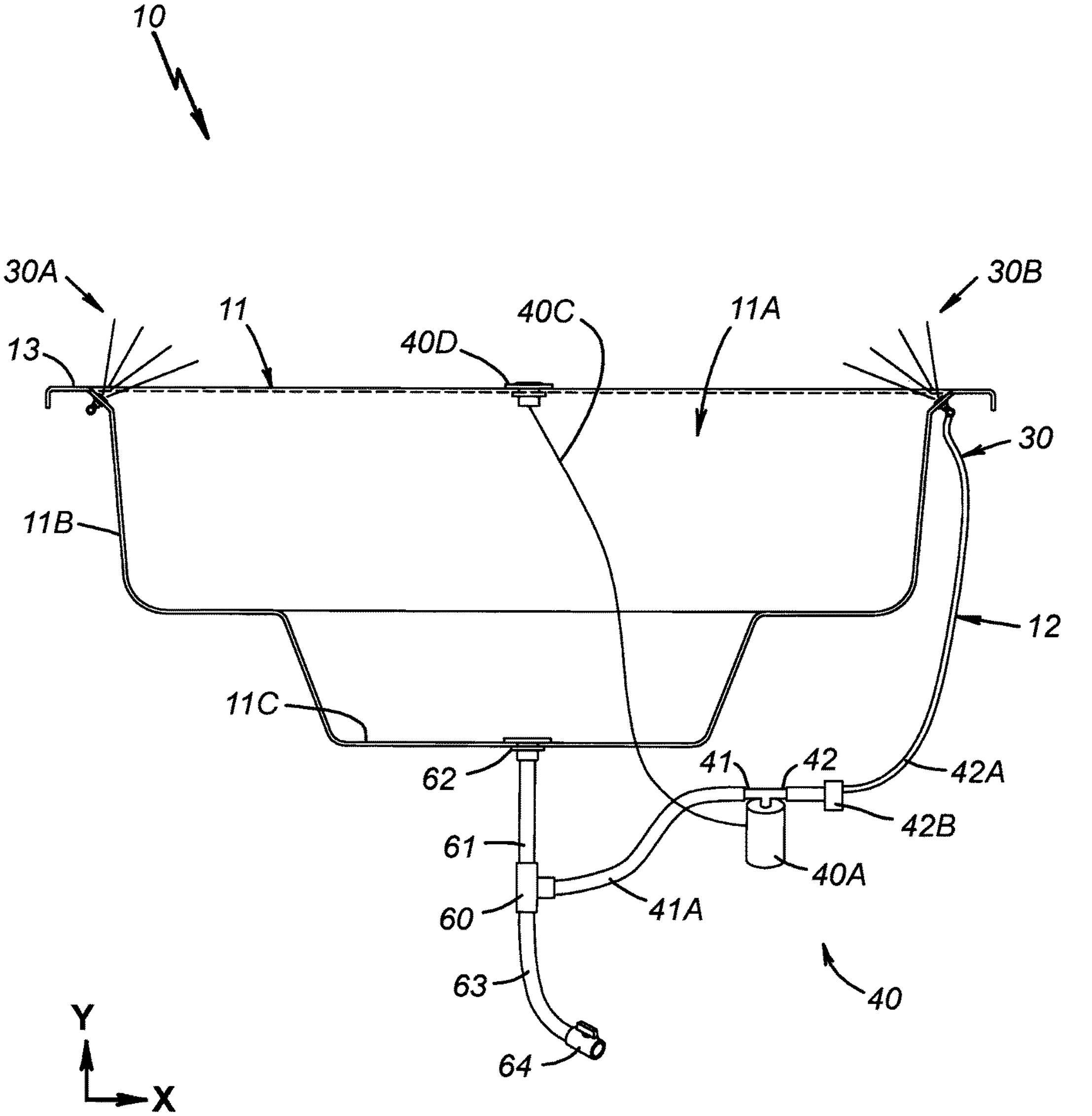
FIG. 6 is a diagrammatic view as viewed in a vertical cross sectional plane, showing the ZMS mounted on the tub structure of the spa, with the inlet of the misting pump connected to the spa drain assembly as a source of spa water for the misting devices.

FIG. 6 summarizes the present invention diagrammatically. It shows the tub structure 11 of the mosquito-repelling spa 10 as it exists with its water-holding interior 11A defined by the sidewall portion 11B and the bottom portion 11C of the tub structure 11. The string 30 of misting devices of the ZMS 12 is mounted on the tub structure 11 (e.g., on the peripheral portion 13 of the tub structure 11) with the outlet 42 of the misting pump 40A connected to the string 30 of misting devices via the output line 42A (and a screen filter 42B in the output line). A control line 40C electrically connects the misting pump 40A to an ON-OFF control 40D (e.g., an electrical switch) that is mounted on the tub structure 11 (e.g., on a control panel of the spa 10). When the user turns the ON-OFF control 40D to an ON position, spa water flowing to the inlet 41 of the misting pump 40A passes through the pump 40A and is delivered under pressure to the string 30 of misting devices by operation of the misting pump 40A. Reference numerals 30A and 30B in FIG. 6 identify images that represent mist emanating from two of the ten misting devices in the string 30.

To access the spa water in the water-holding interior 11A of the tub structure 11 for misting purposes, the inlet 41 of the illustrated misting pump 40A is connected via the inlet line 41A to a plumbing component (e.g., a T-fitting 60). The T-fitting 60 is coupled via a first drain line 61 (e.g., a length of tubing) in fluid communications with a drain assembly 62 on the bottom portion 11C of the tub structure 11. Thus, the inlet 41 is coupled in fluid communications with the drain assembly 62 as a source of spa water.

As an example of how the inlet 41 may be so coupled, the illustrated first drain line 61 may be connected to a hose bib (not shown) that is part of the drain assembly 62. In other words, the drain assembly 62 includes a drain fitting (not individually shown) that is coupled via a length of tubing (not individually shown) to the hose bib, and the line 61 is connected to that hose bib. When the spa 10 is in use without the ZMS 12, such a hose bib is normally closed; the user only opens it to drain spa water from the tub structure 11. But with the ZMS 12 installed on the tub structure 11, such a hose bib is kept opened to allow spa water to flow to the misting pump 40A via the first drain line 61, the T-fitting 60, and the inlet line 41A. The T-fitting 60 is also coupled via a second drain line 63 that is in fluid communications with a drain valve 64 as illustrated in FIG. 6; when the spa 10 is in use, the drain valve 64 is kept closed until the user desires to drain spa water from the tub structure 11.

With the above-described plumbing arrangement, a user can drain spa water from the tub component 11 in a usual way when desired by opening the drain valve 64. In addition, however, with the inlet line 41A coupled in fluid communication with the drain assembly 62 (e.g., using the T-fitting 60 as shown, or otherwise), spa water from the tub structure 11 is able to flow to the inlet 41 of the misting pump 40A as a source of spa water for the string 10 of misting devices. As a result, according to this aspect of the present invention, spa water is accessed for misting purposes without the using a dedicated port or other special spa-water-accessing arrangement on the spa structure 11. From the foregoing description, a person having ordinary skill in the art can readily design other plumbing configurations for conveying water from the drain assembly 62 to the inlet 41 of the misting pump 40

Thus, the invention provides a system for repelling mosquitoes near a spa, thereby avoiding the annoyance and dangers they pose. Although an exemplary embodiment has been shown and described, one of ordinary skill in the art may make many changes, modifications, and substitutions without necessarily departing from the spirit and scope of the invention. As for the specific terminology used to describe the exemplary embodiment, it is not intended to limit the invention; each specific term is intended to include all technical equivalents that operate in a similar manner to accomplish a similar purpose or function.

Concerning the use of "ZMS" herein, it is an acronym for Zika Misting System. As used herein, ZMS herein means a system for repelling mosquitoes near a spa using mist produced with spa water taken from the spa. As used herein, the term "mosquitoes" includes mosquitoes and other flying insects.

What is claimed is:

1. A spa, comprising:

a tub structure;

a plurality of misting devices mounted on the tub structure in order to produce a mist over the tub structure;

a plurality of tubing pieces interconnecting the misting devices in fluid communications with each other;

a misting pump having an inlet and an outlet;

an output line connecting the outlet of the misting pump in fluid communications with the misting devices; and an input line connecting the inlet of the misting pump in fluid communication with the spa in order to receive spa water from the spa for misting purposes;

thereby to enable a user of the spa to step into the spa and to produce an mosquito-repelling mist using chemically treated spa water taken from the spa.

2. A spa as recited in claim 1, wherein:

the spa includes a drain assembly on the tub structure; and the input line of the misting pump is coupled in fluid communications with the drain assembly in order to receive the spa water via the drain assembly.

3. A spa as recited in claim 1, wherein:

the spa includes a peripheral portion of the tub structure; and at least a first misting device of the plurality of misting devices is mounted on the peripheral portion.

4. A spa as recited in claim 3, wherein:

the peripheral portion of the tub structure defines a first through-bore; and the first misting device includes a through-wall fitting that is mounted in the through-bore.

5. A spa, comprising:

a spa tub structure; and a ZMS mounted on the spa tub structure;

wherein the ZMS includes a plurality of misting devices mounted on the tub structure of the spa;

wherein the ZMS includes a plurality of tubing pieces interconnecting the misting devices in fluid communications with each other;

wherein the ZMS includes a misting pump having an inlet and an outlet;

wherein the ZMS includes an output line connecting the outlet of the misting pump in fluid communications with the misting devices; and wherein the ZMS includes an input line connecting the inlet of the misting pump in fluid communication with the spa in order to receive spa water from the spa via the input line;

thereby to enable a user of the spa to step into the spa and to produce an mosquito-repelling mist using chemically treated spa water taken from the spa.

6. A spa as recited in claim 5, wherein:

the spa includes a drain assembly on the tub structure; and the input line of the ZMS is coupled in fluid communications with the drain assembly in order to receive the spa water via the drain assembly.

7. A Zika Misting System (ZMS) for repelling mosquitoes that are near a spa, said spa having a tub structure for a user to step into, the misting system comprising:

a plurality of misting devices for mounting on the tub structure of the spa in order to produce a mosquito-repelling mist over the tub structure;

a plurality of tubing sections interconnecting the misting devices in fluid communications with each other;

a misting pump having an inlet and an outlet;

an output line for connecting the outlet of the misting pump in fluid communications with the misting devices; and an input line for connecting the inlet of the misting pump in fluid communication with the spa.

8. A ZMS as recited in claim 7, further comprising at least one plumbing component for coupling the input line of the ZMS in fluid communications with a drain assembly on the tub structure of the spa in order to receive spa water from the tub structure via the drain assembly.

* * * * *